US012609832B1

(12) United States Patent
Gordon et al.

(10) Patent No.: US 12,609,832 B1
(45) Date of Patent: Apr. 21, 2026

(54) CLIENT INTEGRITY VERIFICATION TECHNIQUES

(71) Applicant: Amazon Technologies, Inc., Seattle, WA (US)

(72) Inventors: Benjamin Gordon, Anaheim, CA (US); Christopher Lee Conover, Winter Garden, FL (US); Christopher Best, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 18/194,187

(22) Filed: Mar. 31, 2023

(51) Int. Cl.
H04L 9/32 (2006.01)

(52) U.S. Cl.
CPC .......... H04L 9/3247 (2013.01); H04L 9/3213 (2013.01)

(58) Field of Classification Search
CPC ............................. H04L 9/3247; H04L 9/3213
See application file for complete search history.

(56) References Cited

U.S. PATENT DOCUMENTS

| | | | | | |
|---|---|---|---|---|---|
| 10,958,689 | B1 * | 3/2021 | Ganesan | ................. | G06N 20/00 |
| 11,080,336 | B2 * | 8/2021 | Van Dusen | ............ | G06Q 50/01 |
| 11,146,598 | B1 * | 10/2021 | Palihakkara | ............ | H04L 51/02 |
| 11,475,374 | B2 * | 10/2022 | Polleri | ................. | G06F 16/211 |
| 11,556,862 | B2 * | 1/2023 | Polleri | ...................... | G06F 8/75 |
| 12,348,559 | B2 * | 7/2025 | Xu | ...................... | H04L 63/0869 |
| 12,368,600 | B2 * | 7/2025 | Wang | .................... | H04L 9/3247 |
| 2008/0313456 | A1 * | 12/2008 | Menadue | ............... | G06Q 30/06 |
| | | | | | 713/156 |
| 2010/0235882 | A1 * | 9/2010 | Moore | ................. | H04L 63/168 |
| | | | | | 709/219 |
| 2012/0213368 | A1 * | 8/2012 | Falk | ...................... | H04L 9/3271 |
| | | | | | 380/270 |
| 2019/0215283 | A1 * | 7/2019 | Nahum | ................. | G06F 40/134 |
| 2020/0192978 | A1 * | 6/2020 | Sivagnanam | ......... | G06F 40/284 |
| 2020/0394713 | A1 * | 12/2020 | Kim | ................... | G06Q 20/3825 |
| 2021/0037048 | A1 * | 2/2021 | Kurupati | ............ | H04L 63/1466 |

(Continued)

FOREIGN PATENT DOCUMENTS

EP          2689371 B1 *    9/2016    ........... G06F 21/552

OTHER PUBLICATIONS

Vikash Kumar et al., A robust Intelligent zero-day cyber attack detection technique, May 28, 2021, Complex & Intelligent System 2021, pp. 1-24 (Year: 2021).*

*Primary Examiner* — Abu S Sholeman
(74) *Attorney, Agent, or Firm* — BakerHostetler

(57) ABSTRACT

A selected value of a binary variable may be selected based on one or more operational classifications corresponding to a client. The selected value may be either a first value indicating that the client is not bot-operated or a second value indicating that the client is bot-operated. A token may be generated having cryptographically signed information indicating the selected value of the binary variable and first client information associated with the client. The token and a first request related to a first computing service may be received from the client. A validity determination for the token may be performed based at least in part on the selected value of the binary variable and the first client information. The validity determination may be that the token is valid or that the token is invalid. An action responsive to the first request may be performed based on the validity determination.

20 Claims, 9 Drawing Sheets

(56)  References Cited

U.S. PATENT DOCUMENTS

| | | | |
|---|---|---|---|
| 2022/0014502 A1* | 1/2022 | Gauthier | H04L 9/30 |
| 2022/0124393 A1* | 4/2022 | Wang | H04N 21/4353 |
| 2022/0138604 A1* | 5/2022 | Mehra | G06F 8/10 |
| | | | 706/46 |
| 2022/0321356 A1* | 10/2022 | Wang | H04L 63/0807 |
| 2023/0199025 A1* | 6/2023 | Xu | H04L 63/0869 |
| | | | 726/22 |
| 2024/0187420 A1* | 6/2024 | Wang | H04L 9/3213 |
| 2025/0131427 A1* | 4/2025 | Chalkias | G06F 21/44 |
| 2025/0300837 A1* | 9/2025 | Yarabolu | H04L 9/50 |
| 2025/0323801 A1* | 10/2025 | Wang | H04L 63/0807 |

* cited by examiner

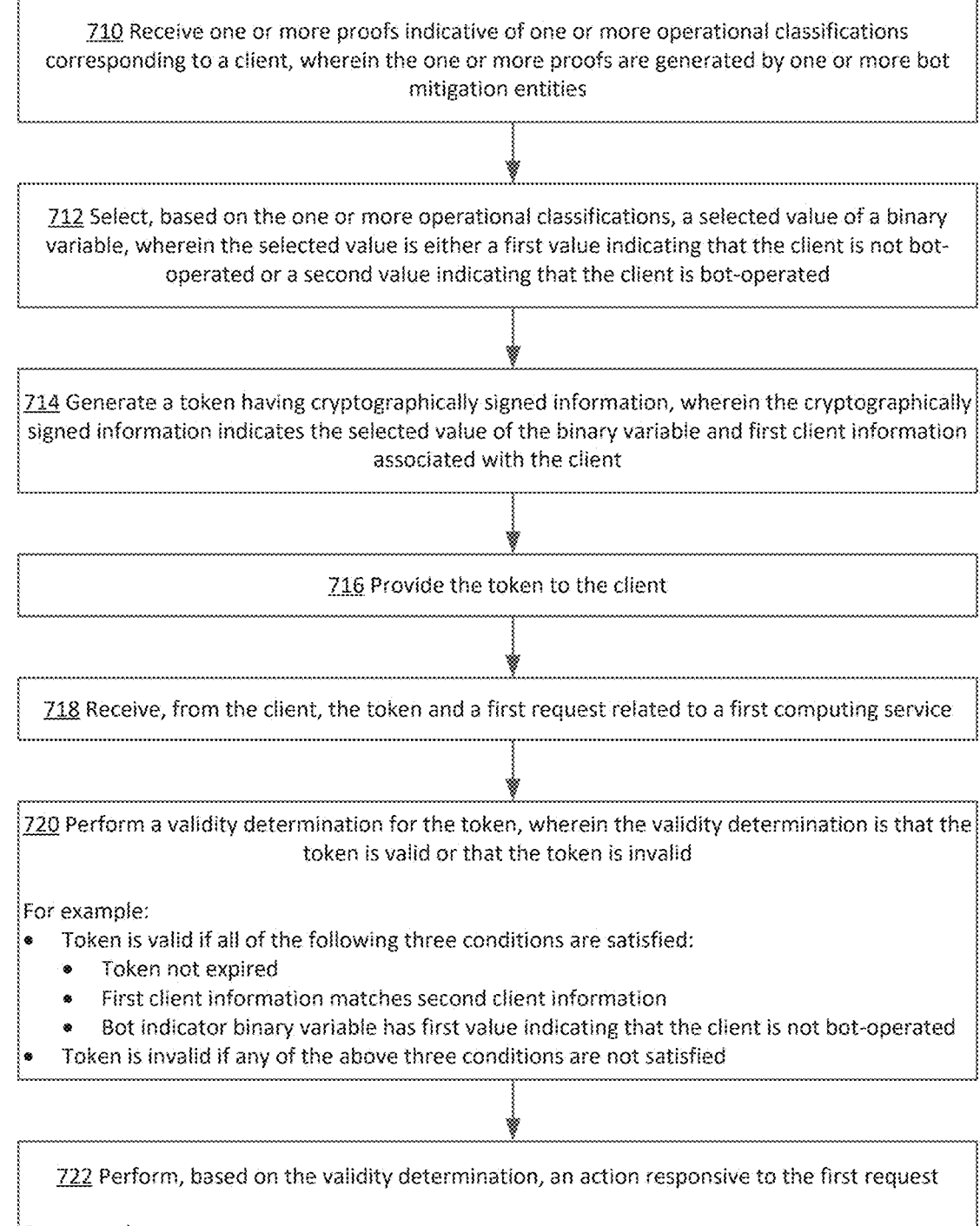

710 Receive one or more proofs indicative of one or more operational classifications corresponding to a client, wherein the one or more proofs are generated by one or more bot mitigation entities 712 Select, based on the one or more operational classifications, a selected value of a binary variable, wherein the selected value is either a first value indicating that the client is not bot-operated or a second value indicating that the client is bot-operated 714 Generate a token having cryptographically signed information, wherein the cryptographically signed information indicates the selected value of the binary variable and first client information associated with the client 716 Provide the token to the client 718 Receive, from the client, the token and a first request related to a first computing service 720 Perform a validity determination for the token, wherein the validity determination is that the token is valid or that the token is invalid For example:
• Token is valid if all of the following three conditions are satisfied:
  • Token not expired
  • First client information matches second client information
  • Bot indicator binary variable has first value indicating that the client is not bot-operated
• Token is invalid if any of the above three conditions are not satisfied 722 Perform, based on the validity determination, an action responsive to the first request For example:
• If token is invalid, send error message indicating token invalidity
• If token is valid, forward request (or corresponding message) to backend service

FIG. 7

CLIENT INTEGRITY VERIFICATION TECHNIQUES

BACKGROUND

Many computing services are predicated on a model in which requests are issued by clients in association with features provided by one or more backend servers. While service providers may often have control of the backend servers that provide the requested features, the service providers may often not have control of the devices from which client requests may originate. One problem with this model is that it may result in certain scenarios in which a bot may attempt to impersonate a human user and issue malicious or otherwise unauthorized requests to a service. For example, some unauthorized network requests may be made by software running in datacenter servers or by using a browser orchestration tool to operate a website automatically.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 is a flowchart illustrating an example client integrity verification process that may be used in accordance with the present description.

DETAILED DESCRIPTION

Figure 1:
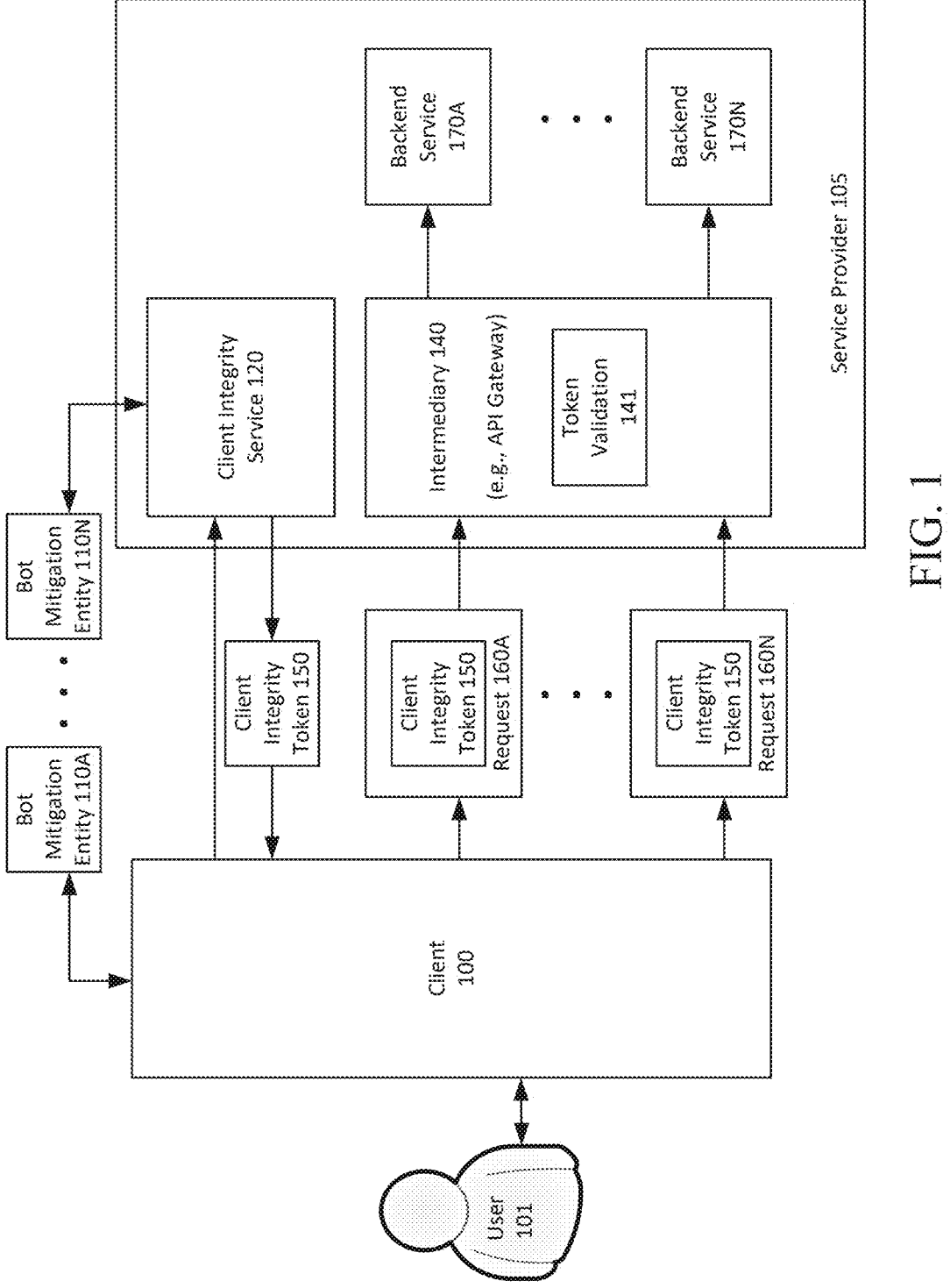
FIG. 1 is a diagram illustrating an example flexible client integrity system that may be used in accordance with the present description.

Techniques for client integrity verification are described herein. The techniques described herein may employ the use of a client integrity token, which may include specific cryptographically signed information that may be used determine whether a request has been issued by a client that is human-operated or a client that is not human-operated (e.g., a request issued by a bot). In particular, the client integrity token may include a bot indicator binary variable (e.g., a Boolean) that may be assigned either a first value indicating that a client is not bot-operated (e.g., is_bad_bot=FALSE) or a second value indicating that a client is bot-operated (e.g., is_bad_bot=TRUE). The client integrity token may also include identifiers associated with a respective client, such as a user identifier, a client identifier, a client internet protocol (IP) address, and/or a device identifier. The techniques described herein may include token granting operations as well as token consumption operations. The token granting operations are operations for granting the client integrity token to a respective client, while the token consumption operations are operations for consuming a token that is provided by the respective client in association with a corresponding network request.

As part of the token granting operations, a client may issue one or more proof requests to one or more bot mitigation entities (e.g., bot mitigation vendors) to provide one or more proofs corresponding to the client. A proof, as that term is used herein, refers to an item that indicates a respective operational classification that is made by a bot mitigation entity based on one or more signals (e.g., browser telemetry signals, hardware specification signals, user agent signals, etc.) that are evaluated by the bot mitigation entity. In some specific examples, a proof may be an encrypted string or a plain text description of the signals that are evaluated by a bot mitigation entity. An operational classification, as that term is used herein, refers to a classification made by a bot mitigation entity relating to whether, or not, a corresponding client is bot-operated. For example, one way in which bots may be employed to issue unauthorized requests is through the use of browser orchestration tools to operate a browser automatically. Thus, some bot mitigation entities may evaluate browser telemetry signals related to the use of browser orchestration tools. As a specific example, some browsers may have a respective browser window height field that indicates a height of a window in which a browser interface is displayed. When a human user is interacting with a browser, the browser will typically have a window height that is large enough to allow the user to view, and potentially interact with, information that is displayed by the browser. Thus, in some examples, a browser window height field of zero (or a height that is smaller than a selected threshold height) may be an indication that a browser is not being operated by a human—and that a browser orchestration tool is being used. Accordingly, some bot mitigation entities may evaluate browser telemetry signals, such as the browser window height field, to attempt to identify evidence of the use of browser orchestration tools. Additionally, some bot mitigation entities may look at other factors, such as whether or not a given client passes, or fails, a Completely Automated Public Turing test to tell Computers and Humans Apart (CAPTCHA), such as by correctly, or not correctly, identifying numbers and/or letters displayed on a screen. Based on these and/or other signals, a bot mitigation entity may formulate an operational classification for a given client relating to whether, or not, the client is bot-operated. Each bot mitigation entity may evaluate different, or partially different, signals in order to generate an operational classification. Upon making an operational classification, a bot mitigation entity may generate a proof that indicates the operational classification.

The one or more proofs requested by the client may be provided by the one or more bot mitigation entities to the client. The client may then issue a token granting request to a client integrity service to grant a client integrity token based on the one or more proofs. For example, in combination with the token granting request, the client may provide the one or more proofs to the client integrity service.

In addition to the one or more proofs, the token granting request may also include client information, such as a user identifier, a client identifier, a client IP address, and/or a device identifier. Upon receipt of the token granting request, the client integrity service may then ask the one or more bot mitigation entities to verify the one or more proofs and provide the one or more corresponding operational classifications indicated by the one or more proofs. The client integrity service may then use the one or more operational classifications from the one or more bot mitigation entities to make a determination of whether, or not, the client is bot operated. This determination may be used to assign the bot indicator binary variable (e.g., a Boolean) either a first value indicating that a client is not bot-operated (e.g., is_bad_bot=FALSE) or a second value indicating that a client is bot-operated (e.g., is_bad_bot=TRUE). The client integrity service may employ custom logic that provides instructions for computing the value of the binary variable based on the one or more operational classifications from the one or more bot mitigation entities. In some examples, the custom logic may include logic for merging a plurality of operational classifications, potentially from a plurality of different bot mitigation entities, into a single binary variable value.

Upon determining an appropriate value for the bot indicator binary variable, the client integrity service may then create the client integrity token. As described above, the client integrity token may comprise cryptographically signed data indicating the assigned value of the bot indicator binary variable as well as the client information (e.g. user identifier, client identifier, client IP address, and/or device identifier) obtained from the token granting request, an indication of a token issuance time at which the token is issued, and an indication of a token expiration time at which the token expires The client integrity token may then be provided, by the client integrity service, to the client.

After the token has been provided to the client, the client may then provide the token in combination with a network request associated with one or more features provided by a backend service. In some examples, the network request may be an application programming interface (API) request corresponding to an API of a service provider that provides the backend service. In addition to including the client integrity token, the network request may also include client information (e.g., user identifier, client identifier, client IP address, and/or device identifier) for the client. The network request may be received by an intermediary, such as a service provider API gateway.

Upon receipt of the network request, the intermediary may obtain the client integrity token included with the network request and may perform a validity determination for the token. The validity determination may be either a determination that the token is valid or a determination that the token is invalid. In order to make the validity determination, the intermediary may decrypt the client integrity token (e.g., using a shared library) and then evaluate the data included in the client integrity token. Specifically, the intermediary may evaluate the token expiration time to confirm that the token is not expired. Additionally, the intermediary may evaluate the client information (e.g. user identifier, client identifier, client IP address, and/or device identifier) in the client integrity token to confirm that it matches the client information (e.g. user identifier, client identifier, client IP address, and/or device identifier) provided along with the network request. Furthermore, the intermediary may evaluate the bot indicator binary variable to confirm that it is assigned the first value indicating that a client is not botoperated (e.g., is_bad_bot=FALSE). If the token is not expired, the client information in the token matches the client information from the network request, and the bot indicator binary variable is assigned the first value indicating that a client is not bot-operated, then the intermediary may determine that the token is valid. Otherwise, the intermediary may determine that the token is invalid. If the intermediary determines that the token is valid, then the intermediary may forward the request and/or a corresponding message to the backend service for processing. By contrast, if the intermediary determines that the token is invalid, then the intermediary may send an error message back to the client indicating that the token is invalid. In some examples, if the token is invalid, the client may then attempt to obtain a new valid token and resubmit the network request with the new valid token.

Thus, the techniques described herein may employ a client integrity token generated based on a single bot detection binary variable whose value is assigned based on one or more operational classifications from one or more bot mitigation entities. The use of the bot detection binary variable may allow the service provider to easily switch between different bot mitigation entities (e.g., different vendors) without having to change the format and/or structure of the client integrity tokens. In some examples, when adding, removing, or switching between bot mitigation entities, the service provider may merely change the logic that is used to assign the value of the binary variable. This may allow the service provider to add, remove, or switch between bot mitigation entities without having to update or modify the intermediary (e.g., API gateway) that evaluates the client integrity tokens for validity. For these reasons, the client integrity token may be agnostic to the particular bot mitigation entities that are employed to provide the proof classifications. Additionally, in some examples, the client integrity token may not be tied to a specific feature and may instead be employed for accessing a wide range of features across a wide range of backend services. Some examples of these features may include chat, watching video, following users, recording telemetry, new features that may not yet be available, and many others. In this manner, the client integrity token may also be agnostic to the particular features for which it is used.

FIG. 1 is a diagram illustrating an example flexible client integrity system that may be used in accordance with the present description. As shown in FIG. 1, client 100 may be operated by user 101, which is a human. Thus, in the example of FIG. 1, client 100 is human-operated. As shown, client 100 may interact with bot mitigation entities 110A-N, such as for requesting one or more proofs indicating one or more operational classifications relating to whether, or not, the client 100 is bot-operated. Some examples of proofs and operational classifications are described in detail below with reference to FIG. 2. The client 100 may then interact with client integrity service 120 to request a client integrity token 150. The client integrity service 120 may then perform token generation to generate the client integrity token 150. Token generation is described in detail below with reference to FIG. 2. As part of token generation, the client integrity service 120 may employ logic to compute, based on the one or more proofs from the bot mitigation entities 110A-N, a value of a bot detection binary variable that indicates whether, or not, client 100 is bot-operated. The client integrity token 150 may then be provided to client 100. An example of client integrity token 150 is described in detail below with reference to FIG. 3.

After the client integrity token 150 has been provided to the client 100, the client 100 may then provide the client integrity token 150 in combination with a request 160A associated with one or more features provided by a backend service 170A operated by service provider 105. The request 160A and client integrity token 150 may be received by an intermediary 140, such as an API gateway of service provider 105. The intermediary 140 may then perform token validation 141 to attempt to validate the client integrity token.

Token validation 141 is described in detail below with reference to FIG. 4. As part of token validation, the intermediary 140 may confirm that the bot indicator binary variable 301 indicates that client 100 is not operated by a bot. If the client integrity token 150 is validated for request 160A, then request 160A may be processed, such as by forwarding request 160A (or a message corresponding thereto) to backend service 170A. If the client integrity token 150 is not validated for request 160A, then an error message may be returned to client 100 indicating that the client integrity token 150 is invalid. If the client integrity token 150 is expired, the client 100 may request a new token from the client integrity service 120. It is noted that the client integrity token 150 may be used and re-used when issuing any number of requests 160A-N associated with features provided by any number of number backend services 170A-N operated by service provider 105. Each time that the client integrity token is provided with one of requests 160A-N, token validation 141 may be performed to confirm the validity of the client integrity token 150.

Figure 2:
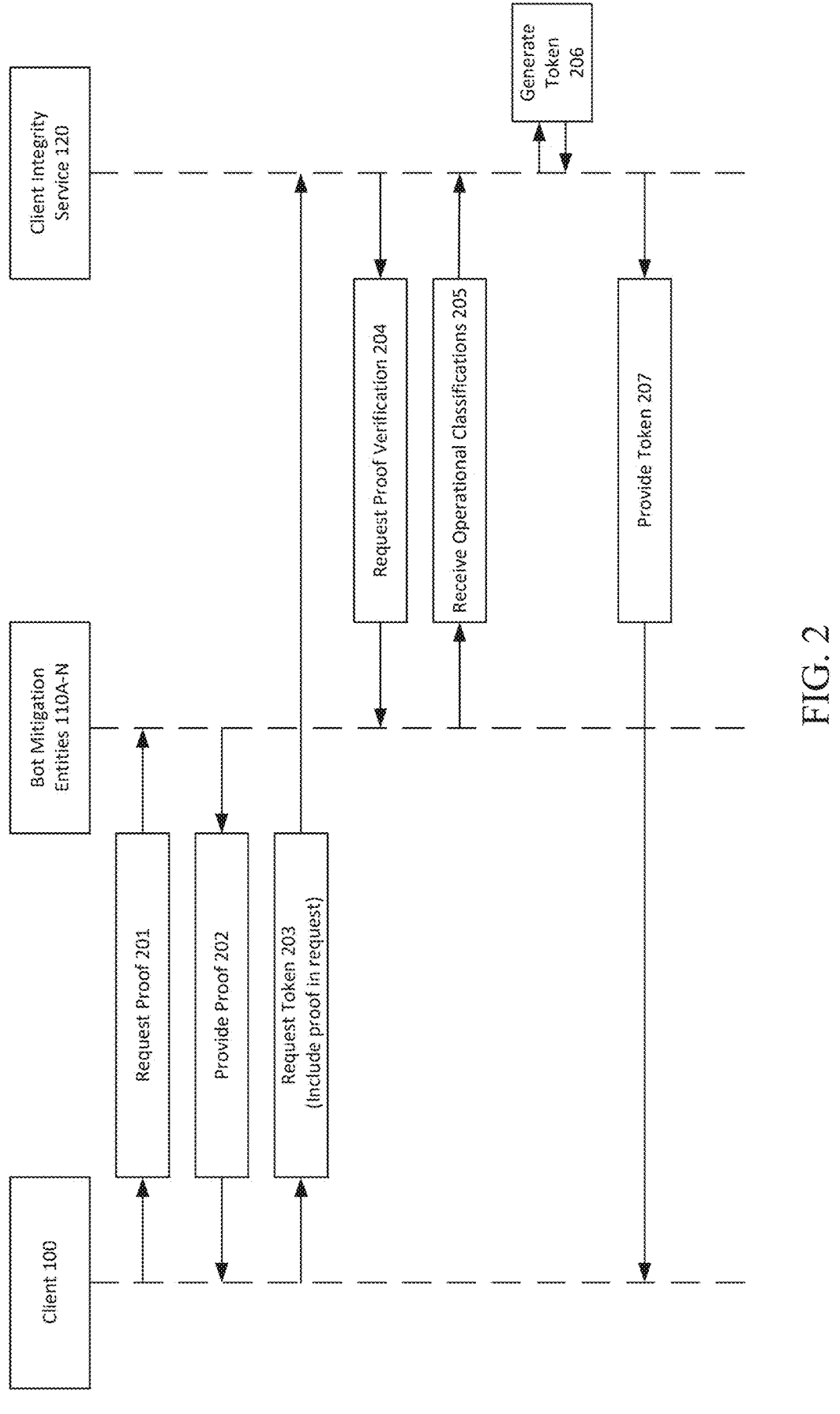
FIG. 2 is a diagram illustrating example token granting interactions that may be used in accordance with the present description.

FIG. 2 is a diagram illustrating example token granting interactions that may be used in accordance with the present description. At act 201, client 100 may issue one or more proof requests to bot mitigation entities 110A-N to provide one or more proofs corresponding to the client 100. A proof is an item that indicates a respective operational classification that is made by a bot mitigation entity 110A-N based on one or more signals (e.g., browser telemetry signals, hardware specification signals, user agent signals, etc.) that are evaluated by the bot mitigation entity 110A-N. In some specific examples, a proof may be an encrypted string or a plain text description of the signals that are evaluated by a bot mitigation entity. An operational classification is a classification made by a bot mitigation entity 110A-N relating to whether, or not, a corresponding client (e.g., client 100) is bot-operated. For example, one way in which bots may be employed to issue unauthorized requests is through the use of browser orchestration tools to operate a browser automatically. Thus, some bot mitigation entities may evaluate browser telemetry signals related to the use of browser orchestration tools. As a specific example, some browsers may have a respective browser window height field that indicates a height of a window in which a browser interface is displayed. When a human user is interacting with a browser, the browser will typically have a window height that is large enough to allow the user to view, and potentially interact with, information that is displayed by the browser. Thus, in some examples, a browser window height field of zero (or a height that is smaller than a selected threshold height) may be an indication that a browser is not being operated by a human—and that a browser orchestration tool is being used. Accordingly, some bot mitigation entities may evaluate browser telemetry signals, such as the browser window height field, to attempt to identify evidence of the use of browser orchestration tools. Additionally, some bot mitigation entities may look at other factors, such as whether or not a given client passes, or fails, a Completely Automated Public Turing test to tell Computers and Humans Apart (CAPTCHA), such as by correctly, or not correctly, identifying numbers and/or letters displayed on a screen. Based on these and/or other signals, a bot mitigation entity 110A-N may formulate an operational classification for client 100 relating to whether, or not, the client 100 is bot-operated. Each bot mitigation entity 110A-N may evaluate different, or partially different, signals in order to generate an operational classification. Upon making an operational classification, a bot mitigation entity 110A-N may generate a proof that indicates the operational classification.

At act 202, the one or more proofs requested by the client 100 are provided by the one or more bot mitigation entities 110A-N to the client 100. At act 203, the client 100 issues a token granting request to the client integrity service 120 to grant a client integrity token 150. For example, in combination with the token granting request, the client 100 may provide the one or more proofs to the client integrity service 120. In addition to the one or more proofs, the token granting request may also include client information, such as a user identifier, a client identifier, a client IP address, and/or a device identifier.

At act 204, the client integrity service 120 asks the bot mitigation entities 110A-N to verify the one or more proofs and provide the one or more corresponding operational classifications indicated by the one or more proofs. Each of the bot mitigation entities 110A-N may then verify each respective proof that it issued. At act 205, the bot mitigation entities may provide, to the client integrity service 120, the operational classifications indicated by each corresponding proof. The client integrity service 120 may then use the one or more operational classifications from bot mitigation entities 110A-N to make a determination of whether, or not, the client 100 is bot operated. This determination may be used to assign the bot indicator binary variable (e.g., a Boolean) either a first value indicating that client 100 is not bot-operated (e.g., is_bad_bot=FALSE) or a second value indicating that client 100 is bot-operated (e.g., is_bad_bot=TRUE). The client integrity service 120 may employ custom logic that provides instructions for computing the value of the binary variable based on the one or more operational classifications from the bot mitigation entities 110A-N. In some examples, the custom logic may include logic for merging a plurality of operational classifications, potentially from a plurality of different bot mitigation entities, into a single binary variable value.

At act 206, the client integrity service 120 may generate the client integrity token 150. As part of act 206, the client integrity service 120 may cryptographically sign data including, for example, the assigned value of the bot indicator binary variable as well as the client information (e.g. user identifier, client identifier, client IP address, and/or device identifier) obtained from the token granting request, an indication of a token issuance time at which the token is issued, an indication of a token expiration time at which the token expires, and other information. At act 207, the client integrity token 150 may be provided, by the client integrity service 120, to the client 100.

Figure 3:
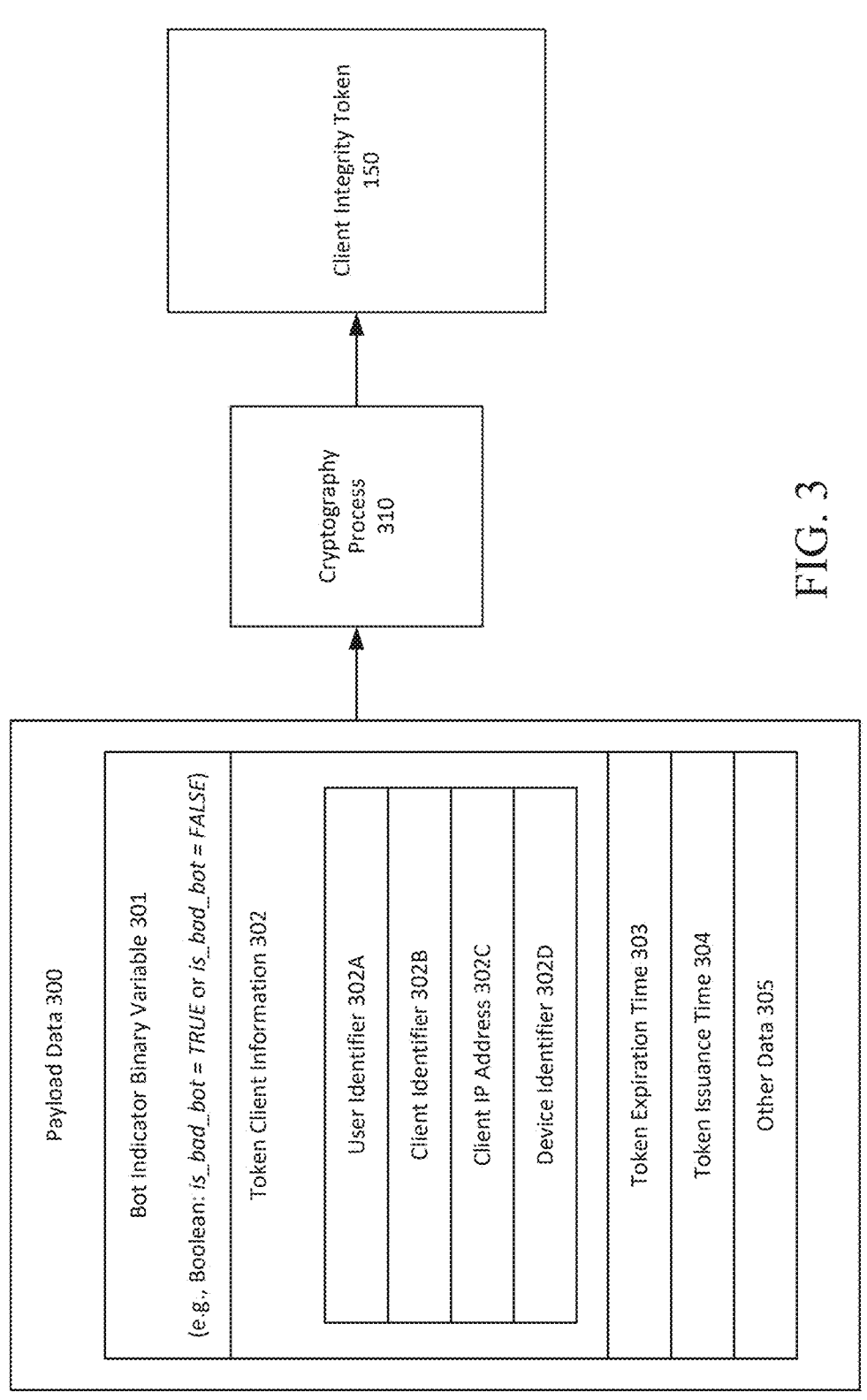
FIG. 3 is a diagram illustrating an example client integrity token that may be used in accordance with the present description.

FIG. 3 is a diagram illustrating an example of a client integrity token 150 that may be used in accordance with the present description. In the example of FIG. 3, the client integrity token 150 is generated by signing, via a cryptography process 310, payload data 300. In this example, payload data 300 includes a bot indicator binary variable 301, token client information 302, token expiration time 303, token issuance time 304, and other information 305. The bot indicator binary variable 301 may be a Boolean and may have either a first value indicating that client 100 is not bot-operated (e.g., is_bad_bot=FALSE) or a second value indicating that client 100 is bot-operated (e.g., is_bad_bot=TRUE). The token client information 302 is information that is included in the client integrity token 150 and that is associated with a client 100 to which the client integrity token 150 corresponds. In this example, the token client information 302 includes user identifier 302A, client identifier 302B, client IP address 302C, and device identifier 302D. The user identifier 302A may be a unique identifier that maps one-to-one with a given user account (e.g., an account belonging to user 101 of FIG. 1 that operates client 100). The client identifier 302B may be an identifier that maps one-to-one with a client (e.g., client 100). The client IP address 302C may be an address of the inbound network request (e.g., the request from client 100 made at act 203 of FIG. 2 for the client integrity token 150), discarding the IP addresses of service provider infrastructure and bot mitigation entity infrastructure that may process the request. The device identifier 302D may be a unique identifier that maps one-to-one to a hardware device from which the token granting request is issued. It is noted that FIG. 3 provides merely one example of data that may be included in token client information 302. Other types of data associated with client 100 may be included in token client information 302 in addition, or as an alternative to, user identifier 302A, client identifier 302B, client IP address 302C, and/or device identifier 302D.

Figure 4:
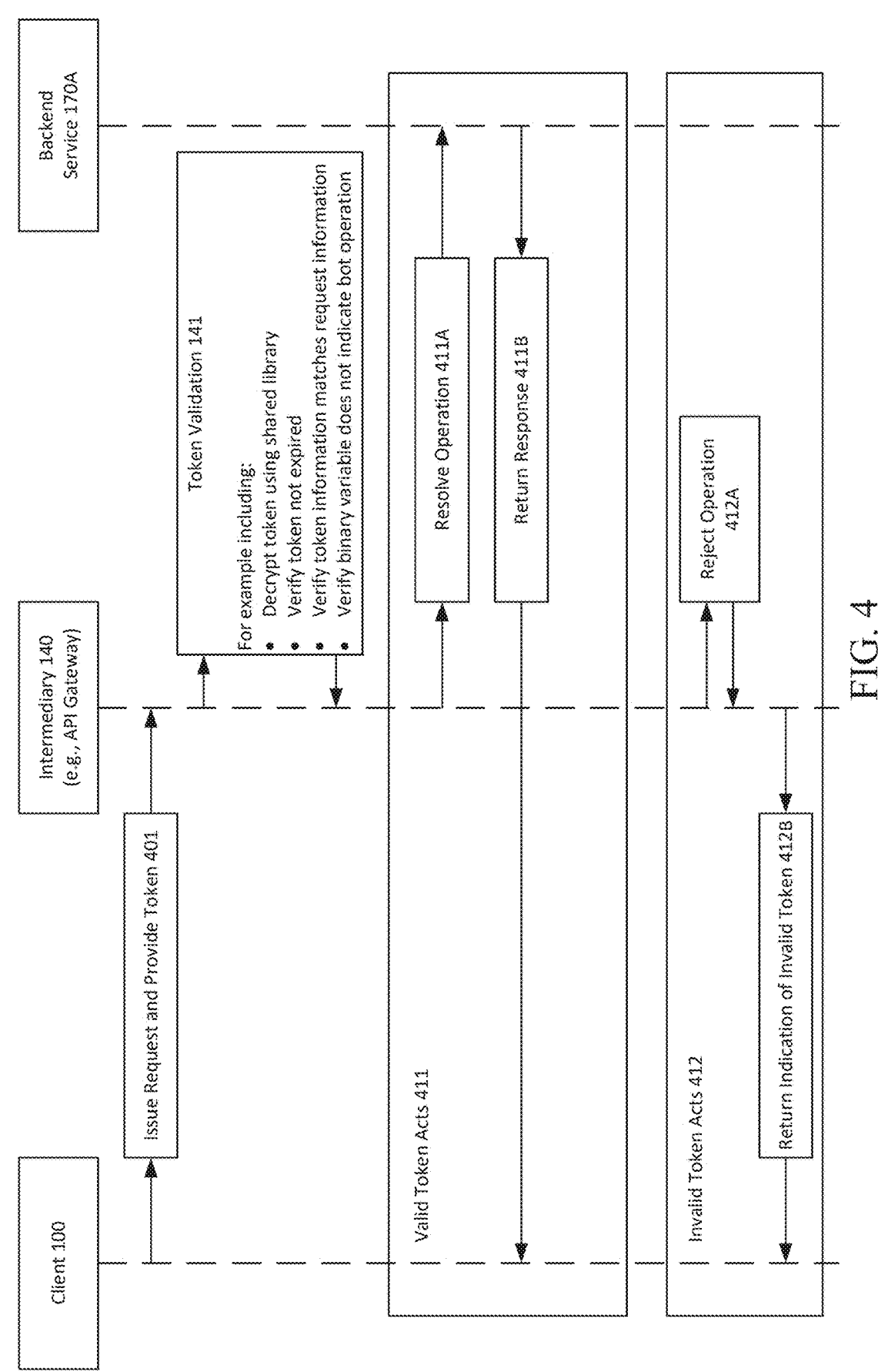
FIG. 4 is a diagram illustrating example token consumption interactions that may be used in accordance with the present description.

FIG. 4 is a diagram illustrating example token consumption interactions that may be used in accordance with the present description. After the client integrity token 150 has been provided to the client 100, the client 100 may then provide the client integrity token 150 in combination with a network request (e.g., request 160A of FIG. 1) associated with one or more features provided by a backend service 170A. As shown in FIG. 4, at act 401, the client 100 may issue the request 160A and provide the client integrity token 150. In some examples, the client integrity token 150 may be included in a header of the request 160A (or another portion of the request 160A). Also, in some examples, the request 160A may be an API request corresponding to an API of a service provider (e.g., service provider 105 of FIG. 1) that provides the backend service 170A. The request 160A may be received by intermediary 140, such as a service provider API gateway.

Figure 5:
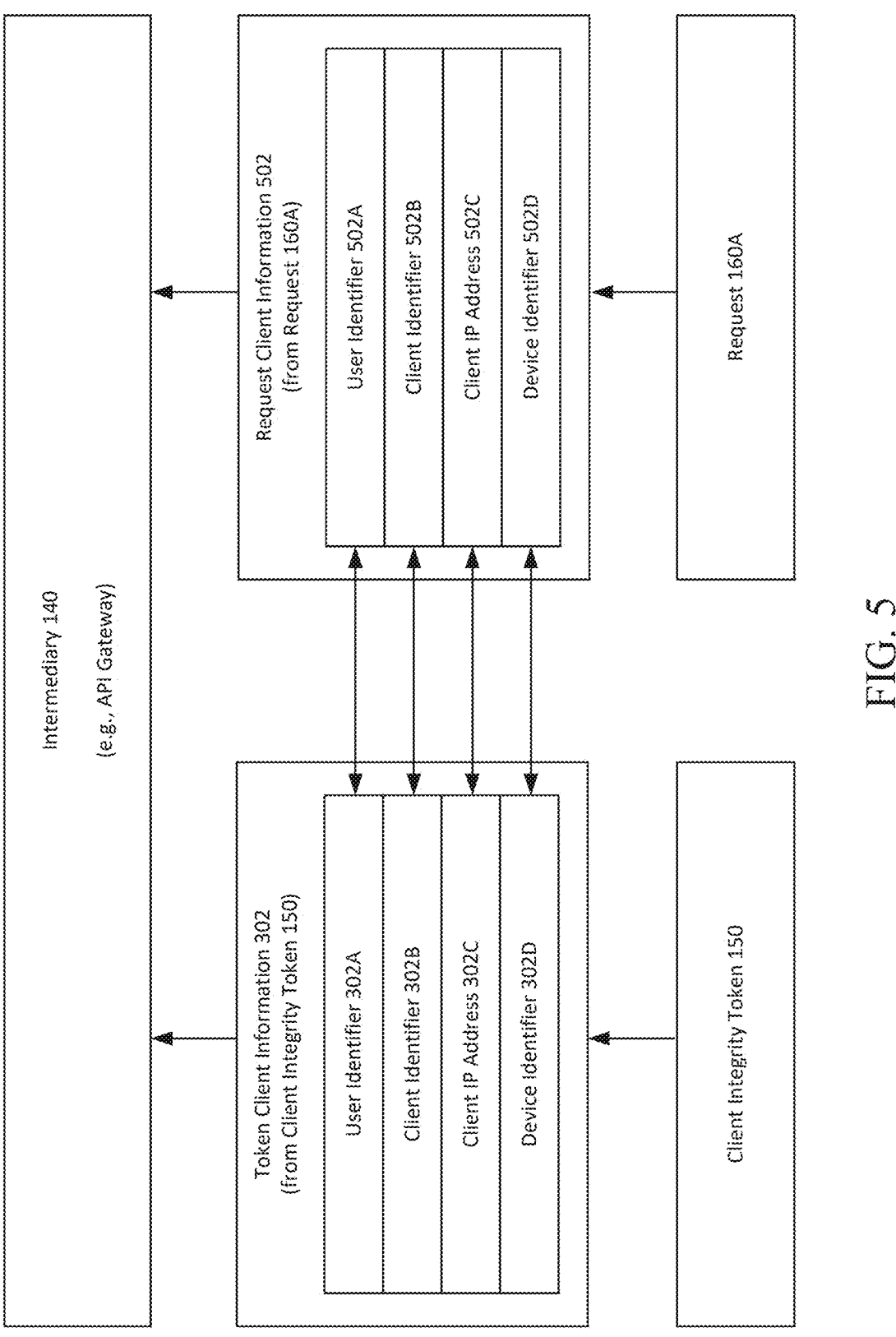
FIG. 5 is a diagram illustrating an example client information comparison that may be used in accordance with the present description.

Referring now to FIG. 5, it is shown that the request 160A may include request client information 502. The request client information 502 is information that is included in request 160A and that is associated with a client 100 that issued request 160A. In this example, the request client information 502 includes user identifier 502A, client identifier 502B, client IP address 502C, and device identifier 502D. The user identifier 502A may be a unique identifier that maps one-to-one with a given user account (e.g., an account belonging to user 101 of FIG. 1 that operates client 100). The client identifier 502B may be an identifier that maps one-to-one with a client (e.g., client 100). The client IP address 502C may be an address of the inbound network request (e.g., the request 160A issued at act 401 of FIG. 4). The device identifier 502D may be a unique identifier that maps one-to-one to a hardware device from which the inbound network request (e.g., the request 160A) is issued. It is noted that FIG. 5 provides merely one example of data that may be included in request client information 502. Other types of data associated with client 100 may be included in request client information 502 in addition, or as an alternative to, user identifier 502A, client identifier 502B, client IP address 502C, and/or device identifier 502D. In some examples, the request client information 502 may be included in any portion, or portions, of the request 160A including, for example, a request network header (e.g., hypertext transfer protocol (HTTP) header) and/or a request body/payload. However, the request client information 502 is external to the client integrity token 150.

Referring back to FIG. 4, upon receipt of the request 160A issued at act 401, the intermediary 140 may obtain the client integrity token 150 included with the request 160A and may perform token validation 141. Token validation 141 may include performing a validity determination for the client integrity token 150. The validity determination may be either a determination that the client integrity token 150 is valid or a determination that the client integrity token 150 is invalid. In order to make the validity determination, the intermediary 140 may decrypt the client integrity token 150 (e.g., using a shared library) and then evaluate the payload data 300 included in the client integrity token 150. Specifically, the intermediary 140 may evaluate the token expiration time 303 to confirm that the client integrity token 150 is not expired. Additionally, and as shown in FIG. 5, the intermediary 140 may evaluate the token client information 302 (e.g., user identifier 302A, client identifier 302B, client IP address 302C, and device identifier 302D) in the client integrity token 150 to confirm that it matches the request client information 502 (e.g., user identifier 502A, client identifier 502B, client IP address 502C, and device identifier 502D) provided along with the request 160A. Specifically, the intermediary 140 may compare user identifier 302A to user identifier 502A to confirm that they match, may compare client identifier 302B to client identifier 502B to confirm that they match, may compare client IP address 302C to client IP address 502C to confirm that they match, and may compare device identifier 302D to device identifier 502D to confirm that they match. Furthermore, the intermediary 140 may evaluate the bot indicator binary variable 301 from the client integrity token 150 to confirm that it is assigned the first value indicating that the client 100 is not bot-operated (e.g., is_bad_bot=FALSE). In some examples, the shared library may be employed to assist in any, or all, of the above-described or other logical checks for validation. Also, in some examples, the shared library may be shared among multiple consumers of verification logic (e.g., multiple API gateway components), such as to prevent different consumers from duplicating logical checks for validity for a single token. If the client integrity token 150 is not expired, the token client information 302 in the client integrity token 150 matches the request client information 502 from the request 160A, and the bot indicator binary variable 301 is assigned the first value indicating that the client 100 is not bot-operated, then the intermediary 140 may determine that the client integrity token 150 is valid. Otherwise, the intermediary 140 may determine that the client integrity token 150 is invalid. Thus, if the client integrity token 150 is expired, then the client integrity token 150 may be invalid. Additionally, if the request client information 502 does not match the token client information 302, then the client integrity token 150 may be invalid. Furthermore, if the bot indicator binary variable 301 is assigned the second value indicating that the client 100 is bot-operated (e.g., is_bad_bot=TRUE), then the client integrity token 150 may be invalid.

If the intermediary 140 determines that the client integrity token 150 is valid, then valid token acts 411 (including acts 411A and 411B) may be performed. Specifically, at act 411A, the intermediary 140 may resolve the operation associated with the request 160A, such as by forwarding the request 160A and/or a corresponding message to the backend service 170A for processing. Additionally, at act 411B, the backend service may respond to the request 160A, such as by returning requested data, confirmation of performance of a requested operation, etc.

By contrast, if the intermediary 140 determines that the client integrity token 150 is invalid, then invalid token acts 412 (including acts 412A and 412B) may be performed. Specifically, at act 412A, the intermediary 140 may reject the operation associated with the request 160A, such as by determining not to forward the request along to the backend service 170A. Additionally, at act 412B, the intermediary 140 returns, to the client 100, an indication of an invalid token, such as an error message indicating that the token is invalid. In some examples, if the token is invalid, then the client may attempt to obtain a new valid token and resubmit the network request with the new valid token.

Figure 6:
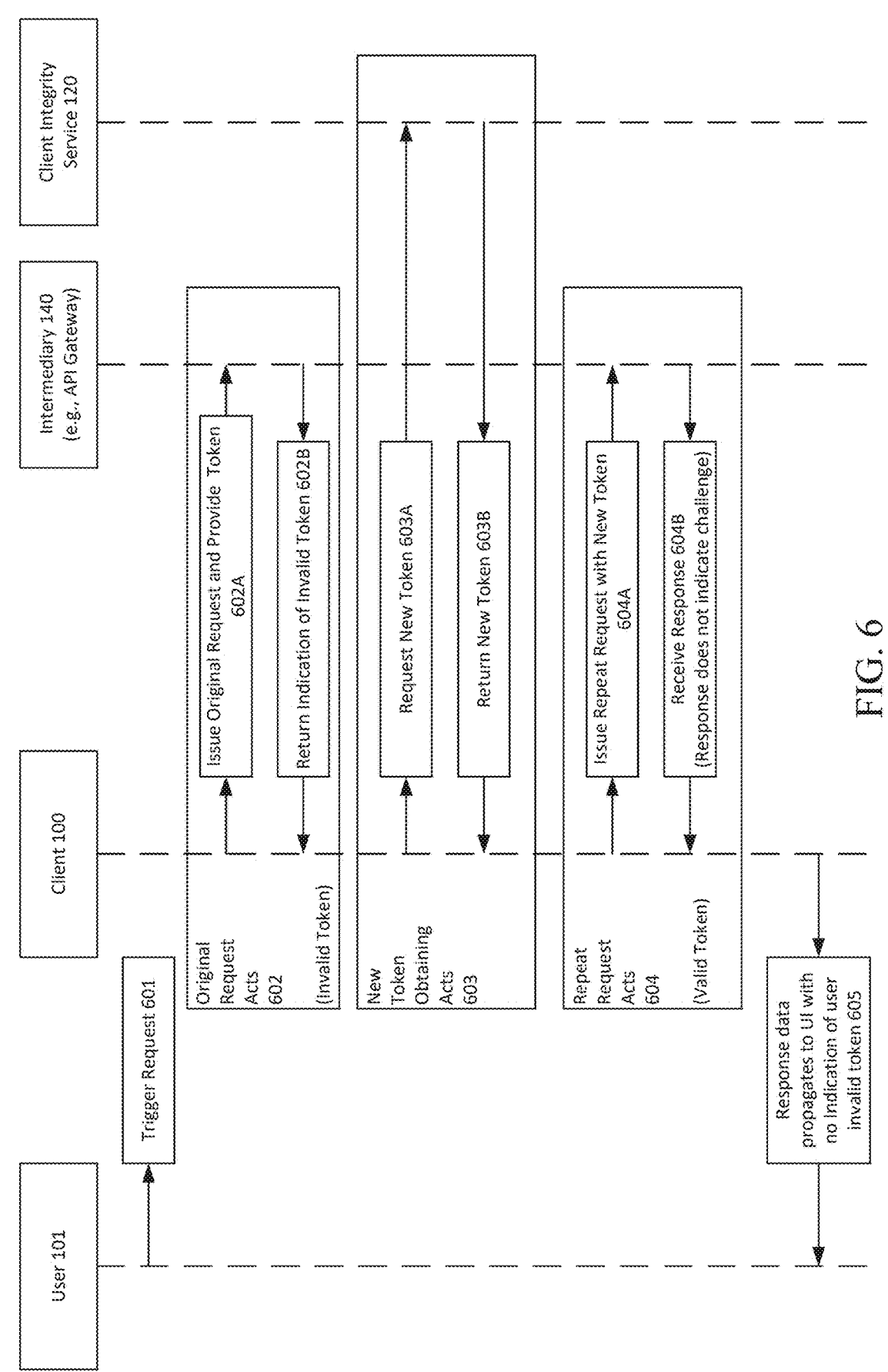
FIG. 6 is a diagram illustrating example token invalidity resolution interactions that may be used in accordance with the present description.

In some examples, when a client integrity token is determined to be invalid, the client 100 may automatically, and without notifying the user 101 of the error, request a new client integrity token and resubmit a corresponding network request using the new client integrity token. By renewing the client integrity tokens automatically and without user input, the token renewal process may be made transparent to users, thereby making the renewal process faster and more efficient and also not unnecessarily interrupting users, thereby improving the user experience. Referring now to FIG. 6, some example token invalidity resolution interactions will now be described in detail. At act 601, the user 101 triggers a network request, such as by providing user input to client 100 that triggers client 100 to issue the network request. In the example of FIG. 6, the client 100 first issues an original network request along with a first client integrity token that is determined to be invalid. This is shown in original request acts 602, which include acts 602A and 602B. Specifically, at act 602A, client 100 may issue an original network request and provide a first client integrity token along with the original network request. The original network request and first client integrity token are received by intermediary 140, which checks the validity of the first client integrity token and determines that the first client integrity token is invalid. In some examples, the first client integrity token may be invalid because it may be expired. Some example processes for checking the validity of a client integrity token are described in detail above with reference to FIG. 4, and these descriptions are not repeated here. At act 602B, the intermediary 140 returns an indication (e.g., error message) that the first client integrity token is invalid. As described above, in this example, the client 100 does not notify the user 101 of the error message or the invalidity of the first client integrity token.

Upon receipt of the indication (e.g., error message) that the first client integrity token is invalid, new token obtaining acts 603, including acts 603A and 603B, may be performed. Specifically, at act 603A, the client 100 may request a new client integrity token (e.g., a second client integrity token) from client integrity service 120. The client integrity service 120 may then generate the new client integrity token for the client 100. Some example processes for generation of a client integrity token are described in detail above with reference to FIG. 2, and these descriptions are not repeated here. At act 603B, the new client integrity token is provided, by the client integrity service 120, to the client 100.

Upon receipt of the new client integrity token, repeat request acts 604, including acts 604A and 604B, may be performed. Specifically, at act 604A, client 100 may issue a repeat network request (a repeat of the original request issued at act 602A) and provide the new client integrity token (the token returned at act 603B) along with the repeat network request. The repeat network request and new client integrity token are received by intermediary 140, which checks the validity of the new client integrity token. In this example, the intermediary 140 determines that the new client integrity token is valid. At act 604B, a response is returned (e.g., from a backend service via the intermediary 140). Because the new client integrity token is determined to be valid, the response does not indicate any challenge to repeat network request. At act 605, the data from the response is propagated to a user interface of the client 100 with no indication, to the user, that the first client integrity token was determined to be invalid and no indication that a new client integrity token was requested and obtained.

FIG. 7 is a flowchart illustrating an example client integrity verification process that may be used in accordance with the present description. In some examples, operations 710-716 may be performed by client integrity service 120, while operations 718-722 may be performed by intermediary 140. At operation 710, one or more proofs are received representative of one or more operational classifications corresponding to a client, wherein the one or more proofs are generated by one or more bot mitigation entities (e.g., bot mitigation vendors). For example, operation 710 may be performed when the client integrity service 120 receives a token granting request from a client 100 to issue a client integrity token 150 for the client 100. In combination with token granting request, the client 100 may provide, to the client integrity service 120, one or more proofs received from one or more bot mitigation entities.

As described above, such as with reference to act 201 of FIG. 2, client 100 may issue one or more proof requests to bot mitigation entities 110A-N to provide one or more proofs corresponding to the client 100. A proof is an item that indicates a respective operational classification that is made by a bot mitigation entity 110A-N based on one or more signals (e.g., browser telemetry signals, hardware specification signals, user agent signals, etc.) that are evaluated by the bot mitigation entity 110A-N. In some specific examples, a proof may be an encrypted string or a plain text description of the signals that are evaluated by a bot mitigation entity. An operational classification is a classification made by a bot mitigation entity 110A-N relating to whether, or not, a corresponding client (e.g., client 100) is botoperated. For example, one way in which bots may be employed to issue unauthorized requests is through the use of browser orchestration tools to operate a browser automatically. Thus, some bot mitigation entities may evaluate browser telemetry signals related to the use of browser orchestration tools. Additionally, some bot mitigation entities may look at other factors, such as whether or not a given client passes, or fails, a Completely Automated Public Turing test to tell Computers and Humans Apart (CAPTCHA), such as by correctly, or not correctly, identifying numbers and/or letters displayed on a screen. Based on these and/or other signals, a bot mitigation entity 110A-N may formulate an operational classification for client 100 relating to whether, or not, the client 100 is bot-operated. Each bot mitigation entity 110A-N may evaluate different, or partially different, signals in order to generate an operational classification. Upon making an operational classification, a bot mitigation entity 110A-N may generate a proof that indicates the operational classification.

As also described above, such as with reference to act 202 of FIG. 2, the one or more proofs requested by the client 100 are provided by the one or more bot mitigation entities 110A-N to the client 100. At act 203, the client 100 issues a token granting request to the client integrity service 120 to grant a client integrity token 150. For example, in combination with the token granting request, the client 100 may provide the one or more proofs to the client integrity service 120. In addition to the one or more proofs, the token granting request may also include client information, such as a user identifier, a client identifier, a client IP address, and/or a device identifier. At act 204, the client integrity service 120 asks the bot mitigation entities 110A-N to verify the one or more proofs and provide the one or more corresponding operational classifications indicated by the one or more proofs. Each of the bot mitigation entities 110A-N may then verify each respective proof that it issued. At act 205, the bot mitigation entities may provide, to the client integrity service 120, the operational classifications indicated by each corresponding proof.

At operation 712, a selected value of a binary variable (e.g., bot indicator binary variable 301 of FIG. 3) is selected based on the one or more operational classifications, wherein the selected value is either a first value indicating that the client is not bot-operated or a second value indicating that the client is bot-operated. As described above, the client integrity service 120 may use the one or more operational classifications from bot mitigation entities 110A-N to make a determination of whether, or not, the client 100 is bot operated. This determination may be used to assign the bot indicator binary variable 301 (e.g., a Boolean) either a first value indicating that client 100 is not bot-operated (e.g., is_bad_bot=FALSE) or a second value indicating that client 100 is bot-operated (e.g., is_bad_bot=TRUE). The client integrity service 120 may employ custom logic that provides instructions for computing the value of the binary variable based on the one or more operational classifications from the bot mitigation entities 110A-N. In some examples, the custom logic may include logic for merging a plurality of operational classifications, potentially from a plurality of different bot mitigation entities, into a single binary variable value. This, in some examples, the one or more operational classifications may include a plurality of operational classifications, which may be from a single bot mitigation entity or from a plurality of different bot mitigation entities. The selecting of the selected value of a binary variable may include merging, based on custom logic, the plurality of operational classifications into the selected value of the binary variable.

At operation 714, a token (e.g., client integrity token 150) is generated having cryptographically signed information (e.g., payload data 300), wherein the cryptographically signed information indicates the selected value of the binary variable (e.g., bot indicator binary variable 301) and first client information (e.g., token client information 302) associated with the client. The term token, as used herein, refers to a data object representing a requester's characteristics. As described above, these characteristics may include, for example, information associated with client 100, such as user identifier 302A, client identifier 302B, client IP address 302C, device identifier 302D, the selected value of the bot indicator binary variable 301, etc. The first client information (e.g., token client information 302) may include at least one of a user identifier, a client identifier, a client internet protocol (IP) address, or a device identifier. As described above with reference to act 206 of FIG. 2, the client integrity service 120 may cryptographically sign data including, for example, the assigned value of the bot indicator binary variable as well as the client information (e.g. user identifier, client identifier, client IP address, and/or device identifier) obtained from the token granting request, an indication of a token issuance time at which the token is issued, an indication of a token expiration time at which the token expires, and other information. As described above with reference to FIG. 3, the token client information 302 may include user identifier 302A, client identifier 302B, client IP address 302C, and device identifier 302D. The user identifier 302A may be a unique identifier that maps one-to-one with a given user account (e.g., an account belonging to user 101 of FIG. 1 that operates client 100). The client identifier 302B may be an identifier that maps one-to-one with a client (e.g., client 100). The client IP address 302C may be an address of the inbound network request (e.g., the request from client 100 made at act 203 of FIG. 2 for the client integrity token 150), discarding the IP addresses of service provider infrastructure and bot mitigation entity infrastructure that may process the request. The device identifier 302D may be a unique identifier that maps one-to-one to a hardware device from which the token granting request is issued.

At operation 716, the token is provided to the client. As described above with reference to act 207 of FIG. 2, the client integrity token 150 may be provided, by the client integrity service 120, to the client 100. In some examples, the token may be usable for issuing a plurality of requests relating to a plurality of features provided by a plurality of different computing services.

At operation 718, the token and a first request (e.g., request 160A) related to a first computing service (e.g., backend service 170A) are received from the client. The token may be received in combination with the first request. For example, the token may be included in a header of the first request (or another portion of the first request). As described above with reference to act 401 of FIG. 4, the client 100 may issue the request 160A and provide the client integrity token 150. In some examples, the request 160A may be an API request corresponding to an API of a service provider (e.g., service provider 105 of FIG. 1) that provides the backend service 170A. The request 160A may be received by intermediary 140, such as a service provider API gateway. As shown in FIG. 5, the request 160A may include request client information 502. The request client information 502 is information that is included in request 160A and that is associated with a client 100 that issued request 160A. In this example, the token client information 302 includes user identifier 502A, client identifier 502B, client IP address 502C, and device identifier 502D. The user identifier 502A may be a unique identifier that maps one-to-one with a given user account (e.g., an account belonging to user 101 of FIG. 1 that operates client 100). The client identifier 502B may be an identifier that maps one-to-one with a client (e.g., client 100). The client IP address 502C may be an address of the inbound network request (e.g., the request 160A issued at act 401 of FIG. 4). The device identifier 502D may be a unique identifier that maps one-to-one to a hardware device from which the inbound network request (e.g., the request 160A) is issued.

At operation 720, a validity determination may be performed for the token, wherein the validity determination is that the token is valid or that the token is invalid. In some examples, the validity determination may be performed based, at least in part, on the selected value of the binary variable and the first client information. Also, in some examples, the validity determination may be further based on an expiration time of the token. In some examples, performing the validity determination may include verifying that the token is not expired. Additionally, performing the validity determination may include verifying that the first client information (e.g., token client information 302) matches second client information (e.g., request client information 502) obtained from the first request. Furthermore, performing the validity determination may include verifying that the selected value is the first value indicating that the client is not bot-operated. As described above with reference to FIG. 4, the intermediary 140 may obtain the client integrity token 150 included with the request 160A and may perform token validation 141. Token validation 141 may include performing a validity determination for the client integrity token 150. The validity determination may be either a determination that the client integrity token 150 is valid or a determination that the client integrity token 150 is invalid. In order to make the validity determination, the intermediary 140 may decrypt the client integrity token 150 (e.g., using a shared library) and then evaluate the payload data 300 included in the client integrity token 150. Specifically, the intermediary 140 may evaluate the token expiration time 303 to confirm that the client integrity token 150 is not expired. Additionally, and as shown in FIG. 5, the intermediary 140 may evaluate the token client information 302 (e.g., user identifier 302A, client identifier 302B, client IP address 302C, and device identifier 302D) in the client integrity token 150 to confirm that it matches the request client information 502 (e.g., user identifier 502A, client identifier 502B, client IP address 502C, and device identifier 502D) provided along with the request 160A. Specifically, the intermediary 140 may compare user identifier 302A to user identifier 502A to confirm that they match, may compare client identifier 302B to client identifier 502B to confirm that they match, may compare client IP address 302C to client IP address 502C to confirm that they match, and may compare device identifier 302D to device identifier 502D to confirm that they match. If any of these value do not match, then the token may be invalid. Furthermore, the intermediary 140 may evaluate the bot indicator binary variable 301 from the client integrity token 150 to confirm that it is assigned the first value indicating that the client 100 is not bot-operated (e.g., is_bad_bot=FALSE). If the client integrity token 150 is not expired, the token client information 302 in the client integrity token 150 matches the request client information 502 from the request 160A, and the bot indicator binary variable 301 is assigned the first value indicating that the client 100 is not bot-operated, then the intermediary 140 may determine that the client integrity token 150 is valid. Otherwise, the intermediary 140 may determine that the client integrity token 150 is invalid. Thus, if the client integrity token 150 is expired, then the client integrity token 150 may be invalid. Additionally, if the request client information 502 does not match the token client information 302, then the client integrity token 150 may be invalid. Furthermore, if the bot indicator binary variable 301 is assigned the second value indicating that the client 100 is bot-operated (e.g., is_bad_bot=TRUE), then the client integrity token 150 may be invalid.

At operation 722, an action responsive to the first request is performed based on the validity determination. If the validity determination is that the token is valid, then operation 722 may include providing, to the first computing service, based on the validity determination being that the token is valid, a message indicative of the first request. As described above with reference to FIG. 4, if the intermediary 140 determines that the client integrity token 150 is valid, then valid token acts 411 (including acts 411A and 411B) may be performed. Specifically, at act 411A, the intermediary 140 may resolve the operation associated with the request 160A, such as by forwarding the request 160A and/or a corresponding message to the backend service 170A for processing. Additionally, at act 411B, the backend service 170A may respond to the request 160A, such as by returning requested data, confirmation of performance of a requested operation, etc.

By contrast, if the validity determination is that the token is invalid, then operation 722 may include providing, to the client, based on the validity determination being that the token is invalid, a response indicating that the token is invalid. As described above with reference to FIG. 4, if the intermediary 140 determines that the client integrity token 150 is invalid, then invalid token acts 412 (including acts 412A and 412B) may be performed. Specifically, at act 412A, the intermediary 140 may reject the operation associated with the request 160A, such as by determining not to forward the request along to the backend service 170A. Additionally, at act 412B, the intermediary 140 returns, to the client 100, an indication of an invalid token, such as an error message indicating that the token is invalid. In some examples, if the token is invalid, then the client may attempt to obtain a new valid token and resubmit the network request with the new valid token.

In some examples, upon receiving the response indicating the token is invalid, the client may automatically request a new token without notifying a user of the client that the token is invalid. In some examples, when a client integrity token is determined to be invalid, the client 100 may automatically, and without notifying the user 101 of the error, request a new client integrity token and resubmit a corresponding network request using the new client integrity token. Some examples of these automatic actions are described in detail above with reference to FIG. 6 and are not repeated here. By renewing the client integrity tokens automatically and without user input, the token renewal process may be made transparent to users, thereby making the renewal process faster and more efficient and also not unnecessarily interrupting users, thereby improving the user experience.

Figure 8:
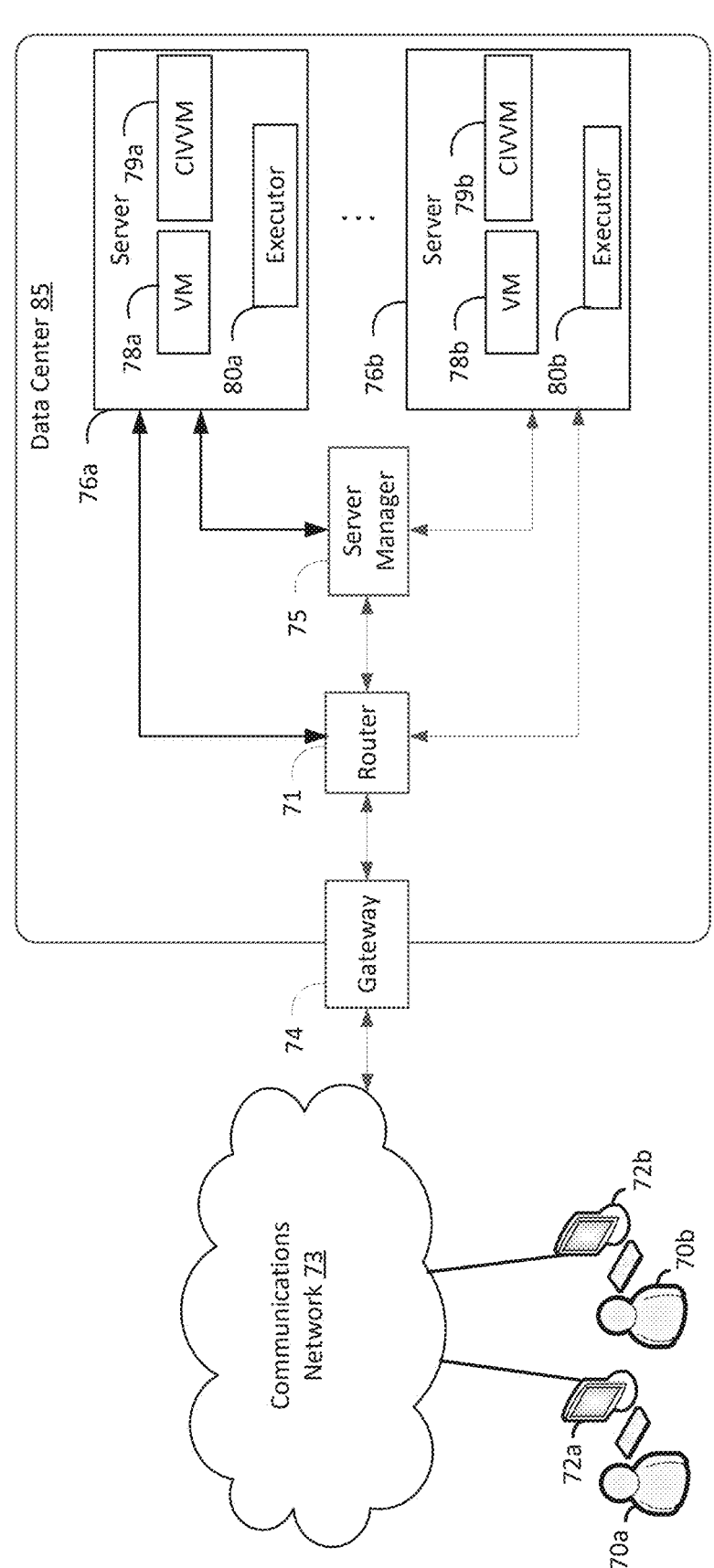
FIG. 8 is a diagram illustrating an example system for transmitting and providing data that may be used in accordance with the present description.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include client integrity verification virtual machines (CIVVM's) 79a-b, which are virtual machines that are configured to execute any, or all, of the client integrity verification techniques and other techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76*a* and 76*b*. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
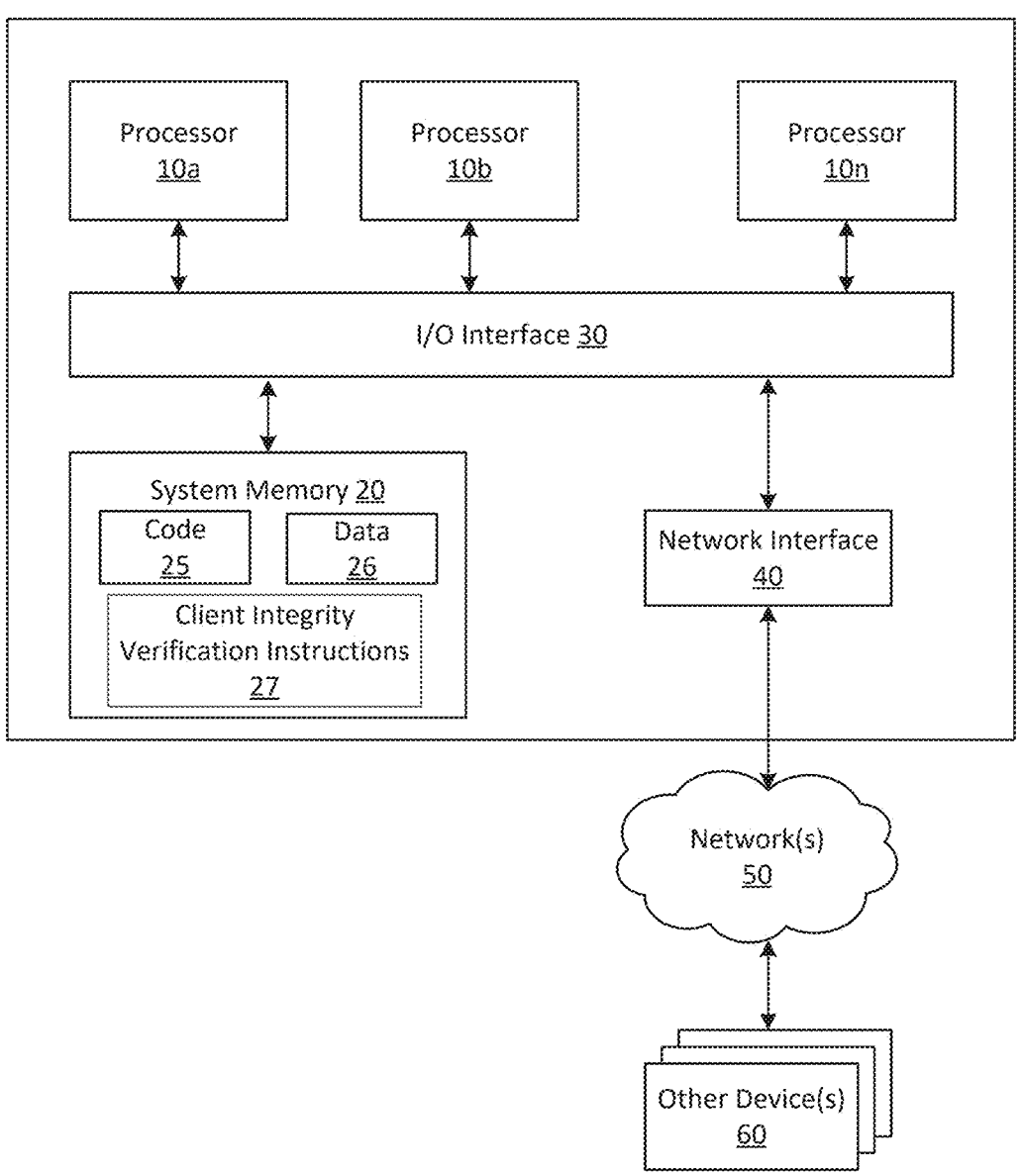
FIG. 9 is a diagram illustrating an example computing system that may be used in accordance with the present description.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes client integrity verification instructions 27, which are instructions for executing any, or all, of the client integrity verification techniques and other techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include nontransitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform computing operations comprising:
receiving one or more proofs indicative of one or more operational classifications corresponding to a client, wherein the one or more proofs are generated by one or more bot mitigation entities;
selecting, based on the one or more operational classifications, a selected value of a binary variable, wherein the one or more operational classifications are formulated based on signals relating to whether, or not, the client is operated by a human user, and wherein the selected value is either a first value indicating that the client is not bot-operated or a second value indicating that the client is bot-operated;
generating a token having cryptographically signed information, wherein the cryptographically signed information indicates the selected value of the binary variable and first client information associated with the client, wherein the first client information comprises at least one of a user identifier, a client identifier, a client internet protocol (IP) address, or a device identifier;
providing the token to the client;
receiving, from the client, the token and a first request related to a first computing service;
performing, based at least in part on the selected value of the binary variable and the first client information, a validity determination for the token, wherein the validity determination is that the token is valid or that the token is invalid; and
performing, based on the validity determination, an action responsive to the first request.

2. The computing system of claim 1, wherein performing the validity determination comprises verifying that the token is not expired.

3. The computing system of claim 1, wherein performing the validity determination comprises verifying that the first client information matches second client information obtained from the first request.

4. The computing system of claim 1, wherein performing the validity determination comprises verifying that the selected value is the first value indicating that the client is not bot-operated.

5. A computer-implemented method comprising:
receiving one or more proofs indicative of one or more operational classifications corresponding to a client, wherein the one or more proofs are generated by one or more bot mitigation entities;

selecting, based on the one or more operational classifications, a selected value of a binary variable, wherein the selected value is either a first value indicating that the client is not bot-operated or a second value indicating that the client is bot-operated;

generating a token having cryptographically signed information, wherein the cryptographically signed information indicates the selected value of the binary variable and first client information associated with the client;

providing the token to the client;

receiving, from the client, the token and a first request related to a first computing service;

performing, based at least in part on the selected value of the binary variable and the first client information, a validity determination for the token, wherein the validity determination is that the token is valid or that the token is invalid; and performing, based on the validity determination, an action responsive to the first request.

6. The computer-implemented method of claim 5, wherein the first client information comprises at least one of a user identifier, a client identifier, a client internet protocol (IP) address, or a device identifier.

7. The computer-implemented method of claim 5, wherein the one or more operational classifications includes a plurality of operational classifications, and wherein the selecting of the selected value of the binary variable comprises merging, based on custom logic, the plurality of operational classifications into the selected value of the binary variable.

8. The computer-implemented method of claim 5, wherein performing the validity determination comprises verifying that the token is not expired.

9. The computer-implemented method of claim 5, wherein performing the validity determination comprises verifying that the first client information matches second client information obtained from the first request.

10. The computer-implemented method of claim 5, wherein performing the validity determination comprises verifying that the selected value is the first value indicating that the client is not bot-operated.

11. The computer-implemented method of claim 5, wherein the token is usable for issuing a plurality of requests relating to a plurality of features provided by a plurality of different computing services.

12. The computer-implemented method of claim 5, wherein the token is included in a header of the first request.

13. The computer-implemented method of claim 5, wherein performing, based on the validity determination, the action responsive to the first request comprises:

providing, to the first computing service, based on the validity determination being that the token is valid, a message indicative of the first request.

14. The computer-implemented method of claim 5, wherein performing, based on the validity determination, the action responsive to the first request comprises:

providing, to the client, based on the validity determination being that the token is invalid, a response indicating that the token is invalid.

15. The computer-implemented method of claim 14, wherein, upon receiving the response indicating the token is invalid, the client automatically requests a new token without notifying a user of the client that the token is invalid.

16. One or more non-transitory computer-readable storage media having stored thereon computing instructions that, upon execution by one or more computing devices, cause the one or more computing devices to perform computing operations comprising:

receiving one or more proofs indicative of one or more operational classifications corresponding to a client, wherein the one or more proofs are generated by one or more bot mitigation entities;

selecting, based on the one or more operational classifications, a selected value of a binary variable, wherein the selected value is either a first value indicating that the client is not bot-operated or a second value indicating that the client is bot-operated;

generating a token having cryptographically signed information, wherein the cryptographically signed information indicates the selected value of the binary variable and first client information associated with the client;

providing the token to the client;

receiving, from the client, the token and a first request related to a first computing service;

performing, based at least in part on the selected value of the binary variable and the first client information, a validity determination for the token, wherein the validity determination is that the token is valid or that the token is invalid; and performing, based on the validity determination, an action responsive to the first request.

17. The one or more non-transitory computer-readable storage media of claim 16, wherein the one or more operational classifications includes a plurality of operational classifications, and wherein the selecting of the selected value of the binary variable comprises merging, based on custom logic, the plurality of operational classifications into the selected value of the binary variable.

18. The one or more non-transitory computer-readable storage media of claim 16, wherein performing, based on the validity determination, the action responsive to the first request comprises:

providing, to the first computing service, based on the validity determination being that the token is valid, a message indicative of the first request.

19. The one or more non-transitory computer-readable storage media of claim 16, wherein performing, based on the validity determination, the action responsive to the first request comprises:

providing, to the client, based on the validity determination being that the token is invalid, a response indicating that the token is invalid.

20. The one or more non-transitory computer-readable storage media of claim 19, wherein, upon receiving the response indicating the token is invalid, the client automatically requests a new token without notifying a user of the client that the token is invalid.

* * * * *